(12) United States Patent
Kaplan et al.

(10) Patent No.: US 7,486,704 B2
(45) Date of Patent: Feb. 3, 2009

(54) METHOD AND DEVICE FOR CONTROLLING THE AMPLITUDE OF THE WAVELENGTH SPECTRUM OF ULTRA-SHORT LIGHT PULSES EMITTED BY MULTIPLE PASSAGE LASER AMPLIFIERS

(75) Inventors: Daniel Kaplan, Paris (FR); Thomas Oksenhendler, Gometz le Chatel (FR); Pierre Tournois, Cagnes sur Mer (FR)

(73) Assignee: Fastlite, Paris (FR)

( * ) Notice: Subject to any disclaimer, the term of this patent is extended or adjusted under 35 U.S.C. 154(b) by 0 days.

(21) Appl. No.: 10/547,703
(22) PCT Filed: Mar. 3, 2004
(86) PCT No.: PCT/FR2004/000491

§ 371 (c)(1),
(2), (4) Date: Jul. 18, 2006

(87) PCT Pub. No.: WO2004/082083

PCT Pub. Date: Sep. 23, 2004

(65) Prior Publication Data

US 2006/0274403 A1    Dec. 7, 2006

(30) Foreign Application Priority Data

Mar. 3, 2003    (FR) .................................. 03 02667

(51) Int. Cl.
*H01S 3/117* (2006.01)
*H01S 3/13* (2006.01)
(52) U.S. Cl. .......................................... 372/13; 372/32
(58) Field of Classification Search .................... 372/31, 372/13, 32
See application file for complete search history.

(56) References Cited

U.S. PATENT DOCUMENTS 3,644,015 A    2/1972   Hearn
3,817,598 A *  6/1974   Taylor ......................... 359/308

(Continued)

FOREIGN PATENT DOCUMENTS

FR    2684194 A1    5/1993
FR    2751094 A1    1/1998
FR    2810750 A1    12/2001
FR    2820837 A1    8/2002

OTHER PUBLICATIONS

Kaplan, D et al., "Theory and Performance of the Acousto Optic Programmable Dispersive Filter used for Femtosecond Laser Pulse Shaping", vol. 12, pp. 69-75 (2002).

(Continued)

*Primary Examiner*—Minsun Harvey
*Assistant Examiner*—Patrick Stafford
(74) *Attorney, Agent, or Firm*—Browdy and Neimark, P.L.L.C.

(57) ABSTRACT

The invention relates to a method and device for controlling the amplitude of the wavelength spectrum of ultra-short light pulses emitted by multipass laser amplifiers. According to the invention, a programmable acousto-optic device (8) is introduced into a laser cavity of a multipass amplifier (10), in order to modify slightly the amplitude of the spectrum of the light pulse with each passage, owing to a collinear or quasi-collinear interaction between the light pulse and a sound beam, the result from the filtering being used on the non-diffracted direct light beam from the acousto-optic interaction.

12 Claims, 5 Drawing Sheets

U.S. PATENT DOCUMENTS

| | | | |
|---|---|---|---|
| 3,951,509 A | * | 4/1976 | Noguchi et al. ............... 359/17 |
| 4,017,807 A | | 4/1977 | Hutcheson et al. |
| 4,622,845 A | * | 11/1986 | Ryan et al. ................ 73/24.02 |
| 4,685,772 A | | 8/1987 | Chang |
| 5,189,676 A | * | 2/1993 | Wysocki et al. ............... 372/6 |
| 6,072,813 A | | 6/2000 | Tournois |
| 2004/0012837 A1 | | 1/2004 | Kaplan et al. |

OTHER PUBLICATIONS

Seres, E et al., "Generation of Intense 8 FS laser pulses", vol. 11, No. 3, pp. 240-247 (Oct. 2003).

Tournois, P, "Acousto-optic programmable dispersive filter for adaptive compensation of group delay time dispersion in laser systems", vol. 140, No. 4-6, pp. 245-249 (Aug. 1997).

Tournois, P., "New Diffraction Grating Pair with Very Linear Dispersion for Laser Pulse Compression", pp. 1414-1415 (May 1993).

Verluise, F et al., "Acousto-optic filter for femtosecond laser pulse shaping, gain narrowing and phase distortion compensation", vol. 39, pp. 442-443 (May 2000).

Verluise, F et al., "Amplitude and Phase control of ultrashort pulses by use of an acousto-optic programmable dispersive filter: pulse compression and shaping", vol. 25, No. 8, pp. 575-577 (Apr. 2000).

Watanabe, A et al, "TeO2 acousto-optic tunable filter", vol. 44, pp. 127-131 (1975).

* cited by examiner

METHOD AND DEVICE FOR CONTROLLING THE AMPLITUDE OF THE WAVELENGTH SPECTRUM OF ULTRA-SHORT LIGHT PULSES EMITTED BY MULTIPLE PASSAGE LASER AMPLIFIERS

BACKGROUND OF THE INVENTION

1. Field of the Invention

The present invention relates to a method and a device for controlling the amplitude of the wavelength spectrum of ultra-short light pulses emitted by multiple passage laser amplifiers.

2. Description of the Prior Art

This method is notably applied to laser amplifiers with multiple passages of light in an amplifier crystal, the amplified light pulses of which have a duration between a few femtoseconds and a few picoseconds.

A laser amplification chain comprises an oscillator and one or more amplifiers; in the case of short pulse laser chains, the oscillator should have a large bandwidth in order to generate a short reference pulse; the bandwidth of said reference pulse is reduced by the amplifiers as a result of an effect of gain reduction on the edges of the spectrum of said reference pulse; this effect contributes to reducing the wavelength spectrum of the pulse during the multiple passages in the amplifier chain; the output pulse of the amplifiers is therefore longer than said reference pulse.

Generally speaking, it is known that to combat this effect of gain reduction, the amplitude of the spectrum of the reference pulse must be reduced at the centre of the bandwidth; this may be achieved by means of a fixed or programmable filter placed between the oscillator and the first amplifier or in the amplifier itself when the latter is of the type with multiple passages of the light pulse in the amplifier crystal.

A reduction in the amplitude of the spectrum of the initial pulse at the centre of the bandwidth, upstream from the amplification, should be all the more significant since post-amplification is large.

It is found that such filtering of the spectrum of the initial pulse, even if it is thereby possible to combat the reduction in bandwidth and to extend the spectrum of the amplified pulse, moreover introduces undesirable phase effects due to the fact that the light propagation velocity in the amplifier crystal is slightly slower when the amplified energy is larger (effect due to the non-linear index of the amplifier crystal).

Thus, the wavelengths of the light corresponding to both ends of the spectrum, have slower propagation velocities in the amplifier crystal than those located in the central portion of said spectrum.

This results in a 3rd order phase distortion introduced by the strong amplitude modulation of the filtered spectrum.

When the filter is placed in the cavity of an amplifier with multiple passages, the light pulse passes N times through the amplifier crystal before being extracted; in this configuration, reduction in the amplitude of the spectrum of the reference pulse, at the centre of the bandwidth, may be the Nth root of the amplitude reduction corresponding to a single passage.

Indeed, if $g_1(\lambda)$ is the curve of the gain versus the wavelength corresponding to the first passage, $g_2(\lambda)$ the curve of the gain corresponding to the $2^{nd}$ passage, ..., $g_N(\lambda)$ the curve of the gain corresponding to the Nth passage, the curve of the total gain corresponding to N passages is:

$$G(\lambda)=g_1(\lambda) \cdot g_2(\lambda) \ldots g_N(\lambda),$$

and if the N passages are gain identical, $g(\lambda)$, then $G(\lambda)=[g(\lambda)]^N$. Thus, a 10 decibel reduction at the centre of the curve of the gain may be obtained by 20 passages with 0.5 decibel in a multiple passage amplifier.

This solution however imposes that the filter introduced into the cavity of the amplifier, has an insertion loss as low as possible in order to maintain the gain of said cavity.

OBJECT OF THE INVENTION

The object of the invention is to eliminate any significant gain reduction at the centre of the amplification bandwidth; for this purpose, it proposes to introduce into the laser cavity of a multiple passage amplifier, a programmable acousto-optical device for slightly changing the amplitude of the spectrum of the light pulse at each of the passages by means of a collinear or quasi-collinear interaction between said light pulse and an acoustic beam, the result of the filtering being utilized on the non-diffracted direct light beam from the acousto-optical interaction.

SUMMARY OF THE INVENTION

More specifically, this programmable filtering function is based on a collinear or quasi-collinear acousto-optical interaction in a birefringent acousto-optical crystal; said acousto-optical crystal for low values of the acoustic power density, performs a convolution between the amplitude of an input optical signal and a signal $S(t/\alpha)$ where $S(t)$ is the acoustic signal proportional to the electrical signal applied to the piezoelectric transducer of the device and $\alpha$ is a scaling factor related to the ratio between the sound velocity and the light velocity in the material. Said convolution is performed on the diffracted portion of the light beam; as for the non-diffracted portion, it is modified by the one's complement of the modulus of said convolution. In other words, on the direct useful path, there only remains the portion of the energy of the wavelengths which have not been diffracted on the diffracted path. The low value of $\alpha$ of the order of $10^{-7}$ allows the optical signals to be controlled in a range from hundreds of terahertz with an electrical signal in a range of tens of megahertz.

Acousto-optical interaction is produced in a tellurium dioxide crystal ($TeO_2$). The optical and acoustic wave propagation directions are in a plane P which contains the axes [110] and [001] of the crystal. The acoustic wave vector K forms an angle $\theta_a$ with the [110] axis. Polarization of the acoustic wave is transverse, perpendicular to the plane P, along the [$\bar{1}$10] axis.

$V(\theta_a)$, $V_{110}$ and $V_{001}$ being the phase velocities of the shear acoustic wave along directions $\theta_a$, [110] and [001], respectively, we have:

$$V^2(\theta_a)=V^2_{110}\cos^2\theta_a+V^2_{001}\sin^2\theta_a \text{ with } V_{110}=615 \text{ m/s}$$
$$\text{and } V_{001}=2,100 \text{ m/s}.$$

Because of the strong elastic anisotropy of the crystal, the direction of the K vector and the direction of the Poynting vector are not collinear. The acoustic Poynting vector forms an angle $\beta_a$ with the [110] axis, defined by:

$$\tan\beta_a=(V_{001}/V_{110})^2 \cdot \tan\theta_a$$

When an ordinary incident optical wave, polarized along the direction [$\bar{1}$10], with a wave vector $k_o$ which forms an angle $\theta_o$ with the [110] axis, interacts with the acoustic wave, an extraordinary optical wave, polarized in the plane P with a wave vector $k_d$, is diffracted with an angle $\theta_d$ relatively to the [110] axis. To maximize the interaction length for a given crystal length, in order to reduce the acoustic power, the ordinary incident beam will be aligned with the Poynting vector of the acoustic beam.

Let $n_o$ and $n_e$ be the ordinary and extraordinary indices along the [110] axis respectively and $n_d$ the extraordinary index associated with angle $\theta_d$: Optical anisotropy $\Delta n = (n_e - n_o)$ being generally small relatively to $n_o$, the following equations may be obtained to the first order in $\Delta n/n_o$:

$$\delta n = n_d - n_o = \Delta n \cdot \cos^2 \theta_o$$

$$\theta_d - \theta_o = -[\Delta n/n_o] \cdot \cos^2 \theta_o \cdot \tan(\theta_o - \theta_a)$$

$$K = k_o \cdot [\Delta n/n_o] \cdot [\cos^2 \theta_o / \cos(\theta_o - \theta_a)]$$

$$\text{Let } \alpha = f/v = \Delta n \cdot [V(\theta_a)/c] \cdot [\cos^2 \theta_o / \cos(\theta_o - \theta_a)]$$

where $\alpha$ is the ratio between the acoustic frequency f and the optical frequency v and c the velocity of light.

The theory and the performances of the acousto-optical programmable dispersive filter used for shaping ultra-short light pulses are described in the article of D. Kaplan and P. Tournois "Theory and performance of the acousto optic programmable dispersive filter used for femtosecond laser pulse shaping" published in the journal, *J. Phys. IV France* 12 (2002), Pr5-69/75.

According to the invention, the device for controlling the amplitude of the wavelength spectrum of ultra-short light pulses may include a circuit for programming the amplitude and frequency (or phase) modulation of the acoustic wave.

Said device provides two output optical waves: a non-diffracted direct wave with the same polarization as the input optical wave, and a diffracted wave with a polarization perpendicular to the polarization of the input optical wave; both waves bear an amplitude modulation of their respective spectra which is a function both of the modulation of the input optical wave and the modulation of the acoustic wave, while being aware that the modulation of the spectrum of the acoustic wave may be programmed so as to change the shape of the optical pulse spectrum at the output of the laser amplification chain.

Only the non-diffracted transmitted direct beam bearing the result of the sought-after change in the spectrum of the light pulse, will be utilized; in the absence of an acoustic signal, the direct beam will not be subject to any attenuation; this is a required condition for satisfactory operation of the amplification chain.

According to a first embodiment of the invention, the device may include an adaptive circuit comprising a measurement of the optical spectrum at the output of the cavity of the amplifier and a feedback circuit acting on the circuit for programming the device in order to change the shape of the spectrum of the light pulses at the output of the laser amplification chain, so that said spectrum complies with the desired template.

Moreover, the fact of introducing into the multiple passage laser amplification cavity, an acousto-optical crystal operating in transmission on the non-diffracted optical beam, leads to an increase in the dispersion of the cavity, which has the effect of lengthening the pulse at each passage in the crystal.

This lengthening effect is very useful for reducing the peak power of the light pulse to be amplified; nevertheless at the output of the last amplification, the pulse must be compressed.

Compression of light pulses via prisms or gratings mainly compensate for the linear dispersions (the group time delay varying with frequency linearly) but does not compensate for non-linear dispersions, notably those introduced by the acousto-optical crystal.

According to another alternative of the invention, a train of two prisms, the apices of which are inverted relatively to the main axis of the laser amplification cavity, is introduced between the bottom mirror of said cavity and the acousto-optical crystal.

According to another alternative of the invention, the prismatic function is integrated into the acousto-optical crystal itself, and the other prism is placed beside said bottom mirror of the laser amplification cavity.

Advantageously, in the method and device described earlier, filtering of the amplitude of the spectrum of the light pulse may be programmed by a generator, which will be controlled by a computer, so as to compensate for the reduction in bandwidth introduced by the amplifier at each of the passages of said light pulse.

BRIEF DESCRIPTION OF THE DRAWINGS

Embodiments of the method according to the invention will be described hereafter, as non-limiting examples with reference to the appended drawings wherein.

DESCRIPTION OF THE PREFERRED EMBODIMENTS

Figure 1:
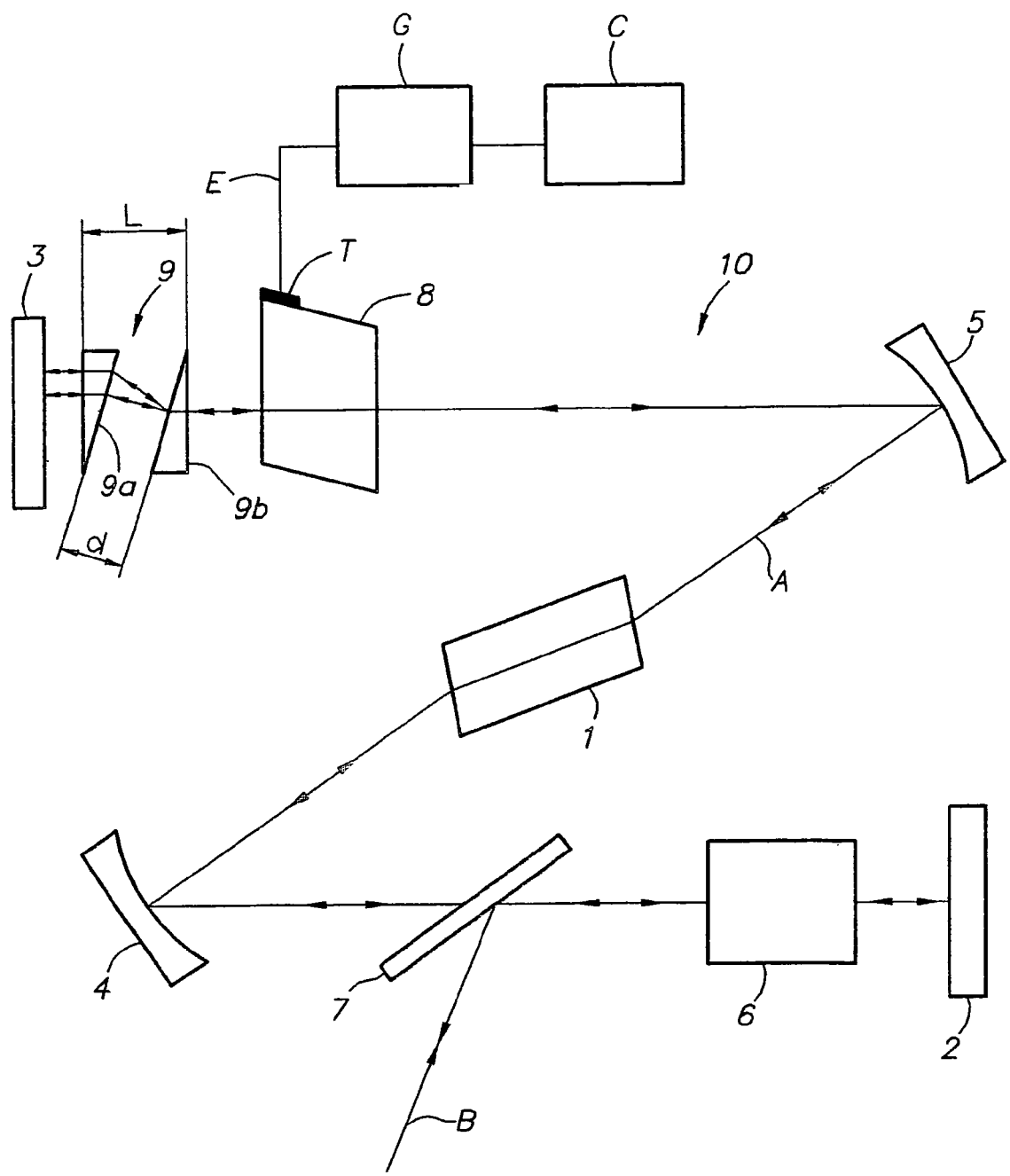
FIG. 1 is a schematic illustration of a multiple passage laser amplification cavity including the acousto-optical device associated with a train of two correction prisms.

In the example illustrated in FIG. 1, the optical signal as ultra-short pulses, travels along the path A several times in the laser amplification cavity 10; at each passage, the optical signal is amplified in the optical amplifier 1 and is reflected between the bottom mirrors 2 and 3 of said cavity, as well as on the intermediate mirrors 4 and 5.

A Pockels cell 6 is centered on the optical path, associated with a polarizer 7, providing introduction or extraction of the optical signal by switching the polarization of the optical wave.

An acousto-optical device 8, for example of the type of those which are described in Patent FR No 00 08278 filed in the name of the applicant, which involve at least one birefringent acousto-optical crystal comprising an input face Fe onto which the optical signal is applied and an output Fs from which emerge the diffracted optical signal and the direct optical signal, along a passage direction, and vice versa during the passage in the reverse direction, and at least one transducer T onto which is applied an electrical signal E from a signal generator G controlled by a computer C.

In the birefringent acousto-optical crystal, the direction of propagation of the energy of the acoustic wave may be collinear or quasi-collinear with the direction of propagation of the energy of the optical wave at their interaction area.

Among the different crystals which may be used (such as, for example, lithium niobate, calcium molybdate, . . . ), tellurium dioxide provides a relatively high acousto-optical efficiency under the conditions mentioned earlier, notably in the case of a slow shear acoustic wave: this material will therefore be used preferably.

Finally, a train 9 of two prisms 9a and 9b is positioned on the path of the optical signal A, between the mirror 3 of said laser amplifier cavity and the acousto-optical device 8; said two prisms are positioned so that the apices are inverted relatively to the path A of the optical signal; both faces perpendicular to said path A are separated by a distance of L; both faces oblique to said path A are separated by a distance of d.

Thus, at each passage of the light pulse following the path, the latter will be amplified by the optical amplifier 1, filtered by the acousto-optical device 8 and corrected by the train 9 of prisms.

By programming the signal generator G with the computer C, an electrical signal E may be applied at the transducer D so as to change the shape of the spectrum of the light pulses at the output of the amplifier cavity 10, via the Pockels cell 6 and the polarizer 7 following the path B.

Said programming of the electrical signal E applied to the transducer T will be such that the wavelength spectrum of the ultra-short light pulses will comply with the desired template.

The prismatic function allowing the non-linear dispersions introduced by the acousto-optical crystal to be compensated for, is provided by the train 9 of two prisms 9a, 9b.

According to an alternative of the invention, the prismatic function may be integrated into the acousto-optical crystal on the one hand, and into the bottom mirror of the laser amplifier cavity on the other hand.

Figure 2:
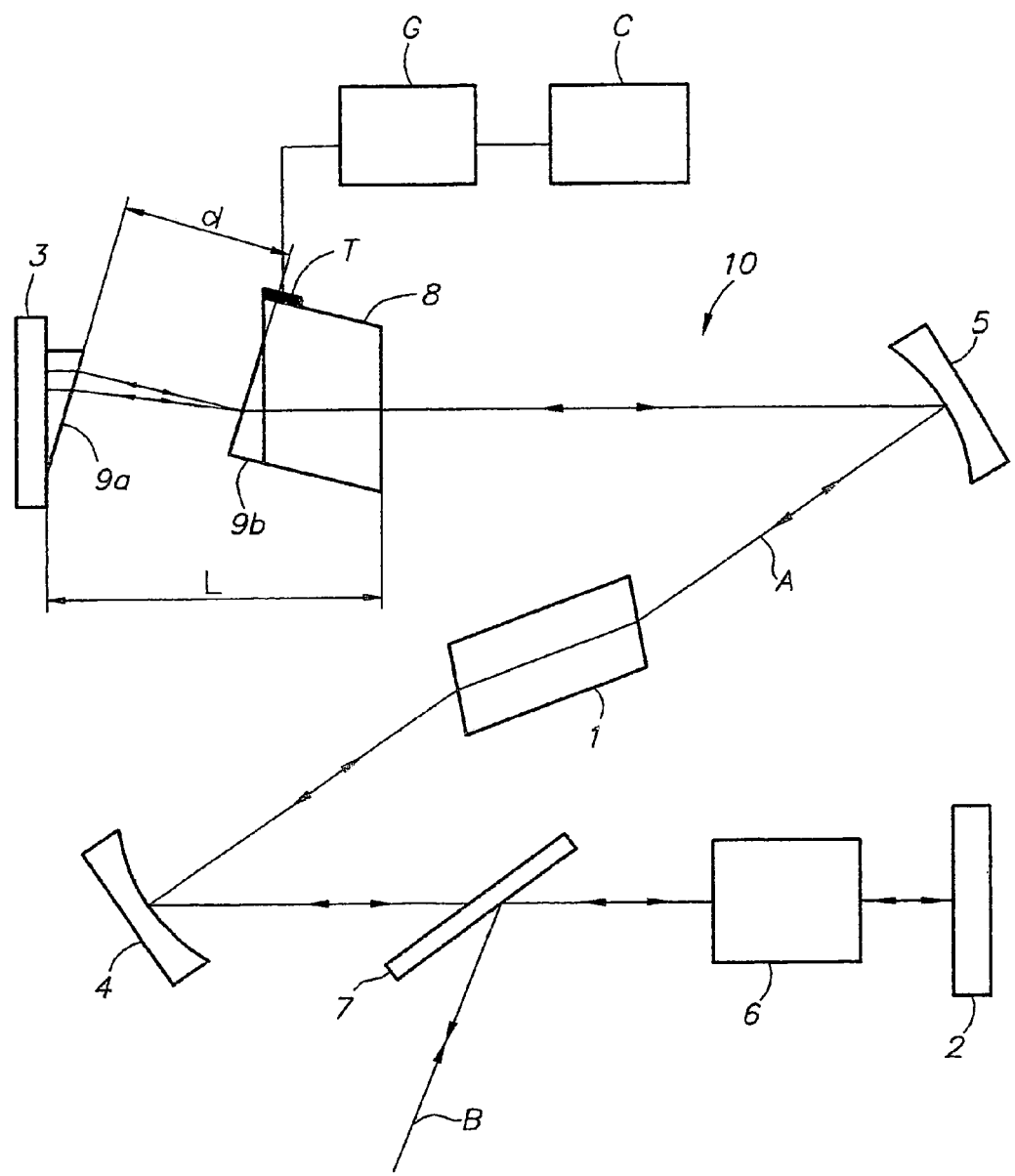
FIG. 2 is a schematic illustration of a multiple passage laser amplification cavity including the prismatic correction function integrated into the acousto-optical device and into the bottom mirror of said cavity.

Thus, in the example illustrated in FIG. 2, the prism 9a is associated with the bottom cavity mirror 3 and the prism 9b is associated with the acousto-optical crystal 8; advantageously, the material making up the prisms 9a and 9b is of the same nature as the one making up the acousto-optical crystal 8.

In order to maximize the interaction length for a given crystal length to thereby provide reduction in the acoustic power delivered by the transducer T, the optical beam will be aligned with the Poynting vector of the acoustic beam.

Figure 3:
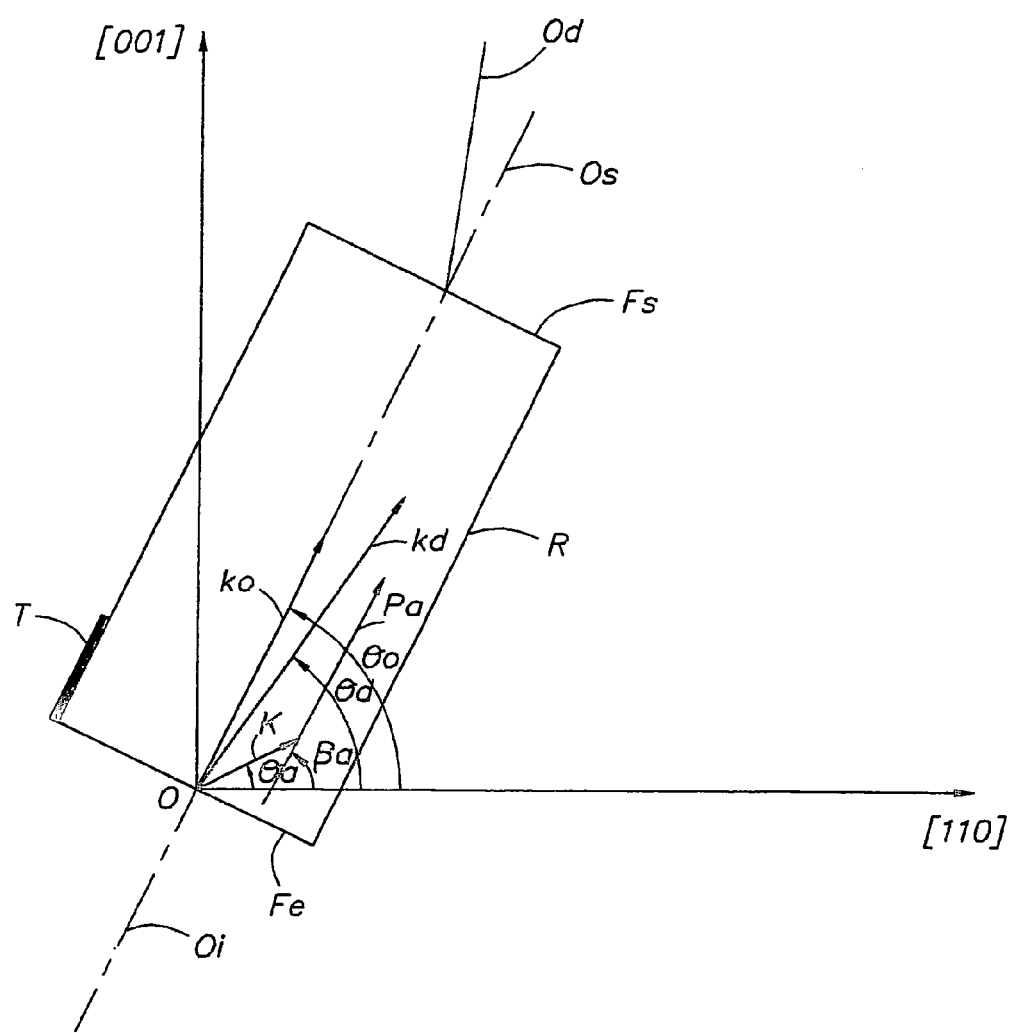
FIG. 3 is a sectional view of a birefringent acousto-optical crystal demonstrating the interaction of optical and acoustic waves.

In the example illustrated in FIG. 3, the programmable acousto-optical device involves an acousto-optical crystal schematically illustrated by a rectangle R and which has, on a small side of said rectangle, an input face Fe, onto which an incident optical beam $O_i$ is applied, perpendicularly to said face Fe, polarized perpendicularly to the plane P containing said rectangle R.

A transducer T located on a large side of said rectangle R, generates a transverse acoustic beam, the shear wave of which is polarized perpendicularly to said plane P, and the wave vector of which is designated by K, located in said plane P.

The incident optical beam $O_i$ propagates in the acousto-optical crystal and emerges out of an output face Fs, located on the other small side of said rectangle, in two beams, one non-diffracted direct beam $O_s$, perpendicular to the output face Fs, and a diffracted extraordinary beam $O_d$, not perpendicular to the output face Fs.

As plane P is orthonormal by the crystal axes [110] and [001], along 0x and 0y, respectively, said crystal, illustrated by the rectangle R is made in such a way that the main axis of the rectangle forms an acute angle with said axis [110] of the crystal.

The acoustic wave is illustrated by its wave vector K forming an angle $\theta_a$ with the [110] axis of the crystal and the Poynting vector $P_a$, forming an angle $\beta_a$ with the [110] axis.

The incident optical wave $O_i$ is directed perpendicularly to the input face Fe of the crystal; its wave vector $k_o$ forms an angle $\theta_o$ with the [110] axis; its polarization is perpendicular to the plane P along the [$\bar{1}$10] axis.

In order to maximize the acousto-optical interaction, the angle $\theta_o$ which the wave vector $k_o$ forms with the [110] axis will be identical with the $\beta_a$ which the Poynting vector $P_a$ of the acoustic wave forms with the [110] axis.

The incident optical wave $O_i$ will be diffracted according to an extraordinary optical wave $O_d$, the polarization of which is perpendicular to that of the incident optical wave $O_i$, and the wave vector $k_d$ forms an angle $\theta_d$ with the [110] axis.

Thus, the result of the filtering, performed by the acousto-optical crystal, is utilized on the non-diffracted direct optical wave $O_s$, with a polarization identical with the one of the incident optical wave $O_i$.

The crystal illustrated by rectangle R, is turned in such a way that the angle $\theta_a$ which the acoustic wave vector K forms with the [110] axis, lies between 0° and 15°.

Figure 4:
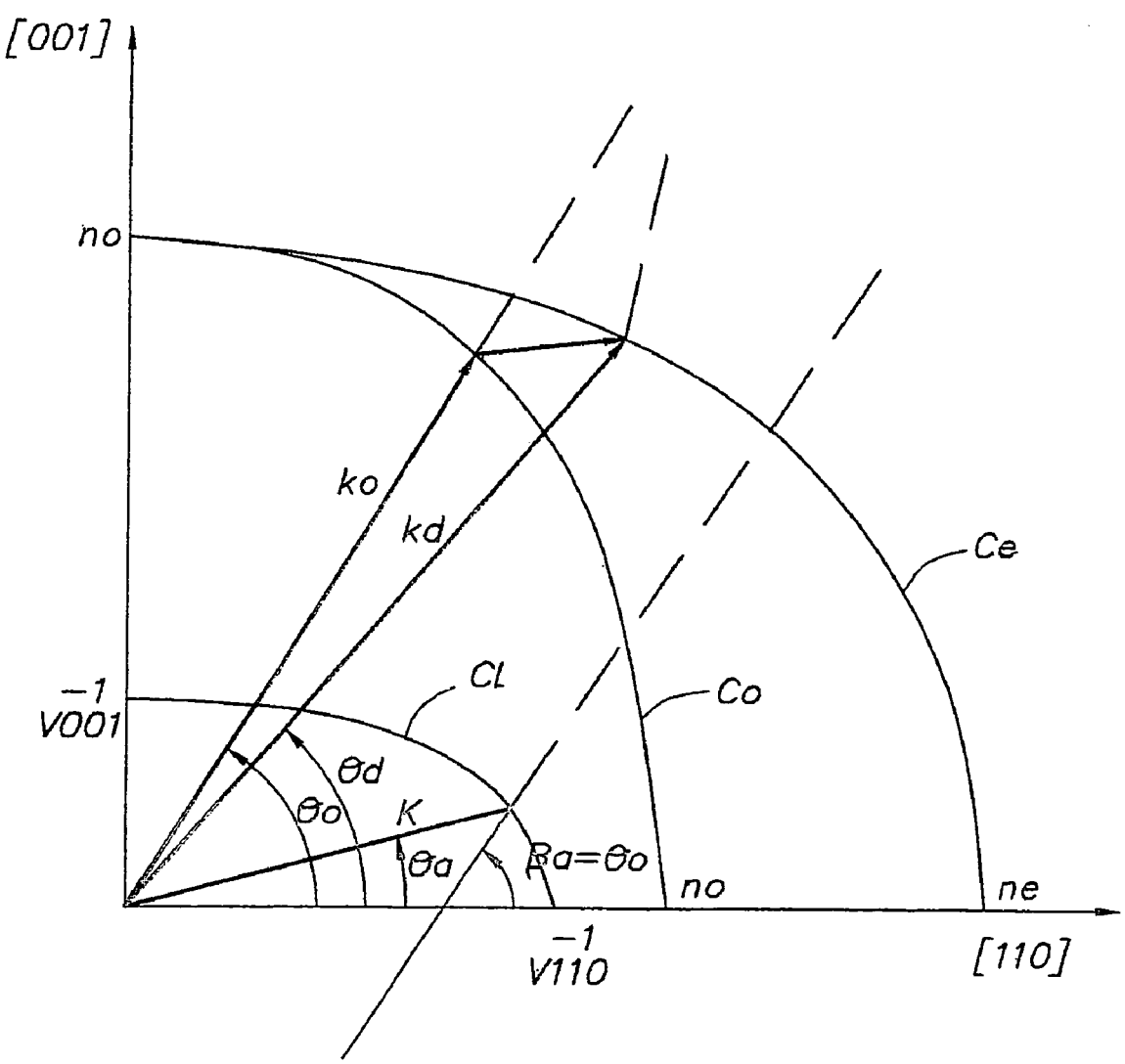
FIG. 4 illustrates to within a scaling factor, the curves of the ordinary and extraordinary indices of a uniaxial birefringent acousto-optical crystal, as well as the curve of acoustic slownesses (reciprocal of acoustic velocities) of the acousto-optical crystal.

The curves of the ordinary and extraordinary indices of an uniaxial, birefringent, acousto-optical crystal as well as the curve of the slownesses of said crystal are shown in FIG. 4, in the orthonormal plane with axes [110] and [001].

The curves of the $C_o$ and $C_e$ indices represent the curve of the ordinary index $n_o$ and the curve of the extraordinary index $n_e$, respectively.

The curve of slownesses $C_L$ illustrates the variation of the reciprocal of the phase velocity of the shear acoustic wave.

As indicated earlier, the crystal is thereby turned in such a way that the Poynting vector of the acoustic wave forms an angle $\beta_a$, relatively to the [110] axis, identical with the one which the incident optical wave vector $k_o$ forms relatively to the same axis.

In order to compensate for the non-linear dispersion (the group delay time varying with frequency non-linearly) introduced by the acousto-optical device 8, a train 9 of two prisms is positioned according to the invention between said acousto-optical device and the bottom mirror 3 of the laser amplifier cavity 10. The dimensions of parameters L and d respectively define the distance which separates both faces of the prisms, normal to the path of the optical signal A, and the distance which separates both oblique faces of said prisms.

Figure 5:
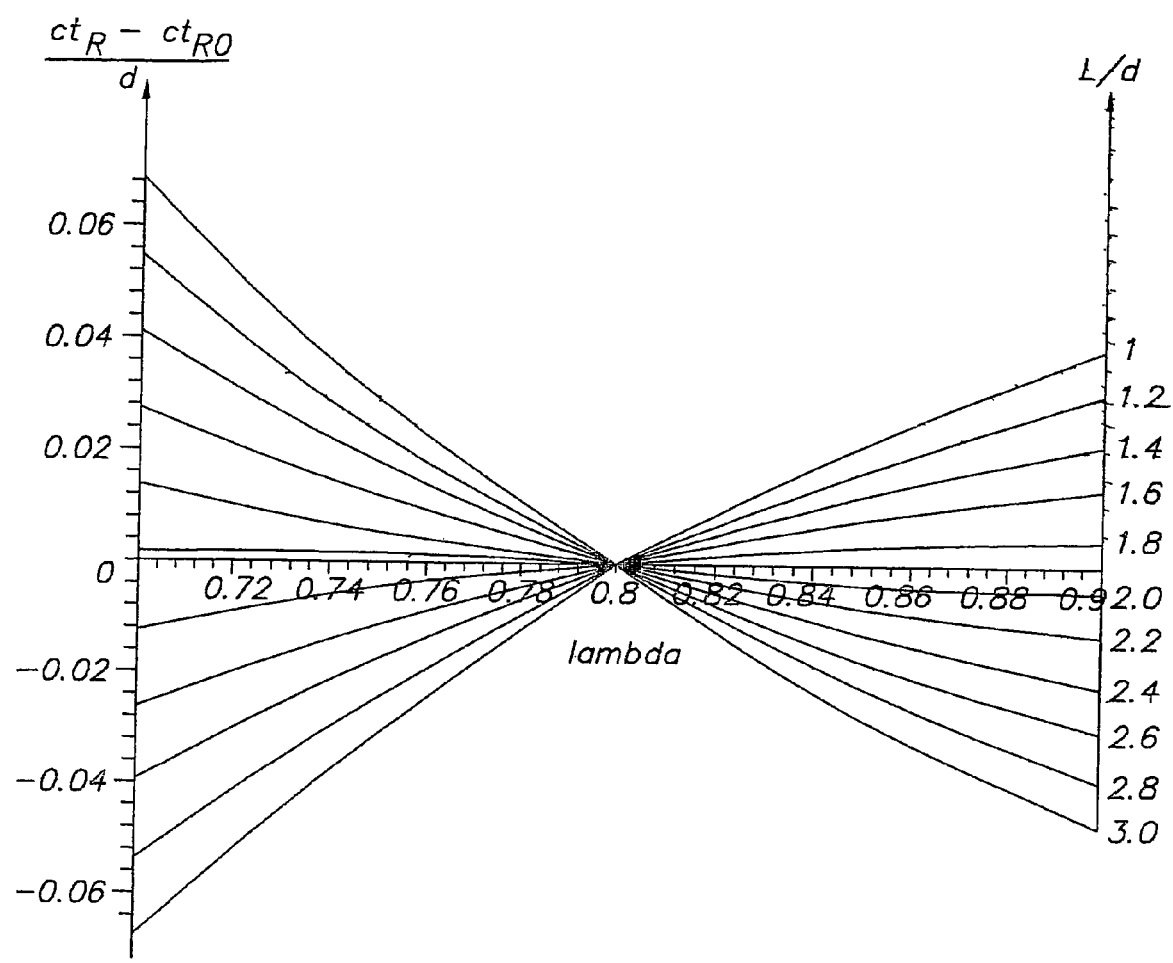
FIG. 5 illustrates the curves of the variation of the group delay time versus the wavelength of the light pulse for different dimensional parameters of the train of both prisms.

As indicated in FIG. 5, according to the schematic illustration depicted by FIG. 2, the L/d ratio varying from 1 to 3, defines a variation of the group time, reduced to the distance d, of +/−0.06.

Said group time variation is close to zero for a L/d ratio located between 1.8 and 2.

Thus, the non-linear dispersions will be compensated as the group time variation is quasi zero for a given geometry of the train of prisms.

The invention claimd is:

1. A method for controlling the amplitude of the wavelength spectrum of ultra-short light pulse having a duration between a few femtoseconds and a few pictoseconds in a laser amplification chain using a laser cavity comprising an amplifier with multiple passages of light in an amplifier crystal, said method comprising filtering of the amplitude of the spectrum of said light pulse at each of said passages by collinear or quasi-linear interaction between said light pulse and transverse shear acoustic wave generated by a transducer in birefringent acousto-optic crystal having an optical axis and an input face onto which an incident optical wave is applied and is divided into said acousto-optic crystal in a diffracted optical wave which is not used and a non diffracted direct optical wave which travels along an internal optical path and which emerges from an output face of said acousto-optic crystal to be used in said laser amplification chain, said incident optical wave being aligned with the Poynting vector of the acoustic wave, said acoustic wave having a vector forming an angle $\theta_a$ comprised between 0° and 15° with said optical axis, said non diffracted direct optical wave having a polarization identical with one of said incident optical waves, said shear acoustic wave being polarized perpendicular to the plane including said internal optical path, said vector of the acoustic wave being located in said plane and said transducer being driven by a generator controlled by a computer to have an amplitude modulation of the spectrum of the non diffracted direct optical wave and to obtain a desired shape of the optical pulse spectrum at the output of the amplification chain.

2. The method according to claim 1, wherein said computer is programmed, so as to compensate for the reduction in bandwidth introduced by the amplifier at each of the passages of said light pulse.

3. The method according to claim 1, comprising an adaptive circuit comprising a measurement of the optical spectrum at the output of the cavity of the amplifier, and a feedback circuit acting on the programming circuit, comprising the aforesaid generator, controlled by the aforesaid computer, in order to change the shape of the spectrum of the light pulses at the output of the laser amplification chain, so that said spectrum complies with the desired template.

4. The method according to claim 1, comprising a train of two prisms the apices of which are inverted relatively to the main axis of the laser amplification cavity, said train being located between the bottom mirror of said cavity and the acousto-optical crystal, with which non-linear dispersions (non-linear group time variations depending on the optical frequency of the light pulses) introduced by said acousto-optical crystal may be compensated.

5. The method according to claim 4, wherein the train of two prisms is integrated into said acousto-optical crystal on the one hand, and into said bottom mirror of said laser amplification cavity on the other hand.

6. The method according to claim 5, wherein the acousto-optical crystal is a tellurium dioxide crystal.

7. A device for applying the method according to claim 1, intended for controlling the amplitude of the wavelength spectrum of a ultra-short light pulse having a duration between a few femtoseconds and a few pictoseconds in a laser amplification chain using a laser cavity comprising an amplifier with multiple passages of light in an amplifier crystal, said method comprising filtering of the amplitude of the spectrum of said light pulse at each of said passages by collinear or quasi-linear interaction between said light pulse and transverse shear acoustic wave generated by a transducer in a birefringent acousto-optic crystal having an optical axis and an input face onto which an incident optical wave is applied and is divided into said acousto-optic crystal in a diffracted optical wave which is not used and a non diffracted direct optical wave which travels along an internal optical path and which emerges from an output face of said acousto-optical crystal to be used in said laser amplification chain, said incident optical wave being aligned with the Poynting vector of the acoustic wave, said acoustice wave having a vector forming an angle $\theta_a$ comprised between 0° and 15° with said optical axis, said non diffracted direct optical wave having a polarization identical with the one of said incident optical wave, said shear acoustic wave being polarized perpendicular to the plane including said internal optical path, said vector of the acoustic wave being located in said plane and said transducer being driven by a generator controlled by a computer to have an amplitude modulation of the spectrum of the non diffracted direct optical wave and to obtain a desired shape of the optical pulse spectrum at the output of the amplification chain.

8. The device according to claim 7, wherein said computer is programmed, in order to compensate for the reduction in bandwidth introduced by the amplifier at each of the passages of said light pulse.

9. The device according to claim 7, comprising an adaptive circuit comprising a measurement of the optical spectrum at the output of the cavity of the amplifier and a feedback circuit acting on the programming circuit comprising the aforesaid generator controlled by the aforesaid computer, in order to change the shape of the spectrum of the light pulses at the output of the laser amplification chain, so that said spectrum complies with the desired template.

10. The device according to claim 7, comprising a train of two prisms, the apices of which are inverted relatively to the main axis of the laser amplification cavity, said train being located between the bottom mirror of said cavity and the acousto-optical crystal, with which non-linear dispersions (non-linear group time variations depending on the optical frequency of the light pulses) introduced by said acousto-optical crystal may be compensated.

11. The device according to claims 10, wherein the train of two prisms is integrated into said acousto-optical crystal on the one hand, and into the bottom mirror of said laser amplification cavity on the other hand.

12. The device according to claim 10, wherein the acousto-optical crystal is a tellurium dioxide crystal.

* * * * *